United States Patent [19]
Jansen

[11] Patent Number: 5,983,074
[45] Date of Patent: Nov. 9, 1999

[54] REMOTE COMMAND, CONTROL AND MONITORING OF APPARATUS BY WAY OF EXISTING PAGING SERVICE NETWORK

[75] Inventor: John T. Jansen, Milford, Conn.

[73] Assignee: Reactel, Inc., New Haven, Conn.

[21] Appl. No.: 08/874,619

[22] Filed: Jun. 13, 1997

Related U.S. Application Data

[60] Provisional application No. 60/019,975, Jun. 17, 1996.

[51] Int. Cl.[6] .............................. H04Q 7/00; H04Q 9/00
[52] U.S. Cl. ......................................... 455/31.3; 455/458
[58] Field of Search ...................... 340/825.44; 455/31.3, 455/38.1, 456, 457, 458, 518, 519, 38.4, 426, 31.2, 31.1, 38.2, 422, 520

[56] References Cited

U.S. PATENT DOCUMENTS

| | | | |
|---|---|---|---|
| 3,047,845 | 7/1962 | Hansson | 340/870.03 |
| 4,031,517 | 6/1977 | Hirtle | 364/200 |
| 4,208,630 | 6/1980 | Martinez | 375/7 |
| 4,691,341 | 9/1987 | Knoble et al. | 379/87 |
| 4,783,654 | 11/1988 | Ichikawa | 455/38.4 |
| 4,882,579 | 11/1989 | Siwiak | 340/825.44 |
| 4,962,522 | 10/1990 | Marian | 379/5 |
| 5,142,279 | 8/1992 | Jasinski et al. | 340/825.44 |
| 5,150,114 | 9/1992 | Johansson | 340/825.54 |
| 5,150,954 | 9/1992 | Hoff | 340/825.44 |
| 5,231,273 | 7/1993 | Caswell et al. | 235/385 |
| 5,438,329 | 8/1995 | Gastouniotis et al. | 340/870.02 |
| 5,473,667 | 12/1995 | Neustein | 340/825.44 |
| 5,481,259 | 1/1996 | Bane | 340/870.03 |
| 5,845,202 | 12/1998 | Davis | 455/426 |

*Primary Examiner*—Reinhard J. Eisenzopf
*Assistant Examiner*—Edan Orgad
*Attorney, Agent, or Firm*—Robert A. Seemann

[57] ABSTRACT

A plurality of radio pagers which can perform apparatus related tasks and which include the same unique pager address ID code, emulate to an available commercial paging service a single pager having the unique pager address ID code, in responding with an acknowledgement transmission to receipt by the plurality of radio pagers to a location request transmission from the available commercial paging service of the unique pager address ID code.

8 Claims, 5 Drawing Sheets

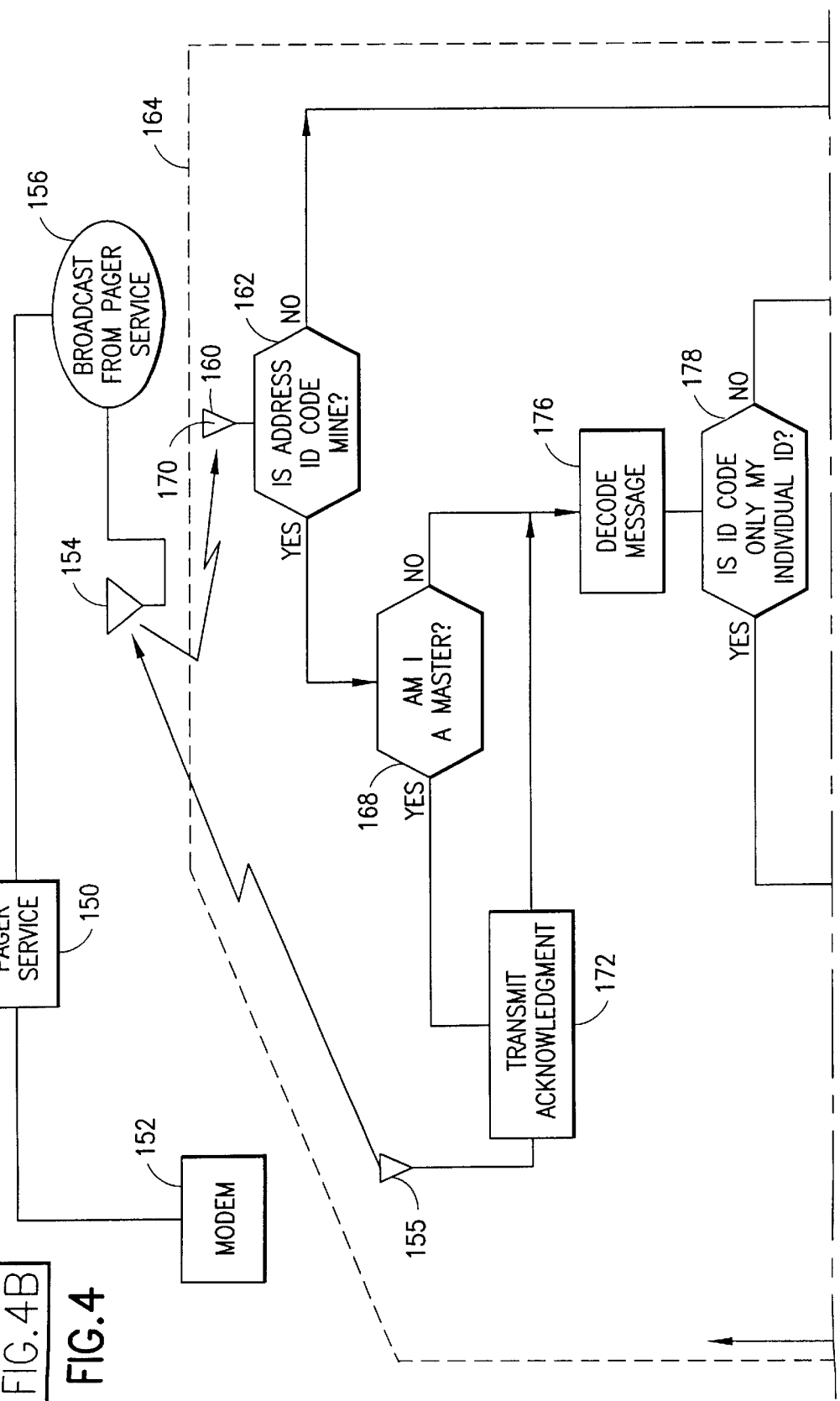

REMOTE COMMAND, CONTROL AND MONITORING OF APPARATUS BY WAY OF EXISTING PAGING SERVICE NETWORK

This application claims the benefit of U.S. Provisional Application No. 60/019,975, filed Jun. 17, 1996.

BACKGROUND OF THE INVENTION

1. Field of the Invention

This invention relates to telephonic communications in which a telephone system is combined with a diverse electrical system for signalling purposes, more specifically it pertains to remote command, control and monitoring of a plurality of fixed site independent operating systems such as public utility electric, gas and water meters, by way of an existing commercial paging service network.

2. Description of the Prior Art

Most electric, gas and water meters are read by a utility service provider person who visits each meter site. Alternatively, a large user site such as a manufacturing plant may be wired by a telephone line to the utility.

The majority of meters are in residences, stores, and small business facilities. Taking the readings is costly, time consuming, and sometimes hazardous from weather and from entering upon private properties. Not all regularly scheduled readings can be taken.

One improved system has the meter in the building wired to a plug in a box mounted outside the building so that the visiting meter reader can plug a hand-held computer into the box to obtain a reading from the meter.

Another improved system adds a low powered transmitter to the meter so that the visiting meter reader obtains each reading by driving past the site.

If the utility service provider wishes to provide information to the user, and provide command or control service of the user site, additional difficulty and cost is incurred.

A utility may wish to inform a site of an impending change in electrical voltage or price rate, a safety alert, security breach, or end of service warning in pay-before-use arrangements.

The utility may wish to command a computer to read meters in an apartment building, and store it for a single quick read, or to transmit it in a single burst in a subsequent polling of sites, or to disconnect, reconnect and/or regulate service, shed load, prompt selected alarms, or remotely control user equipment to operate when demand on the utility is low, to provide a lower price rate.

For reliability and safety, a site should be able to initiate transmission of information to the utility to report an unexpected situation which requires attention by the utility, and to report to the utility upon demand by the utility.

Providers of the above services need a system which provides low cost two-way transmission and reception between the utility and individual sites and between the utility and groups of sites, with little delay between the need for a communication and its accomplishment.

Present remote monitoring systems primarily use the public telephone network, unlicensed radio and proprietary fixed and licensed radio systems.

Wherein the heaviest of two-way communication with a site may only require bursts of from a fraction of a second to a few seconds long, minutes, hours or days apart, this is costly for each communication and/or each site because of initial investment in equipment, or because tariffs are intended for continuous use of the communication network or medium.

The time that a communications network is utilized for remote command, control and monitoring (RCC&M) is short relative to most other uses for the network because RCC&M message lengths are brief with long idle periods. It is presently costly to remotely control and monitor many sites by way of existing communications networks.

Cable and cellular system pricing structures are relatively costly for meter reading requirements. Other systems such as communicating over power lines carry their own additional costs.

It is not practical to invest more than a few hundred dollars on a residential site to bring it onto a remote command/control and monitoring system because revenue from a residential or a small business site is relatively small compared to total revenue from all sites.

Since more than eighty-five percent of meters are attached to residences, it is no wonder that only a small percentage of all meters and related sites have been instrumented for one or two-way communication.

In FIG. 1, PRIOR ART commercial paging service network 20 is accessed by telephone 26 by which a message of instruction is sent to central controller 30 for processing by an area transponder 46 for transmission by antenna cluster 34 to a particular one of pagers 36 by the paging network.

Each pager has its own unique address ID code AB12, BC14, FA12, EA19, DB16, or EB17. The message called in to the central controller over the telephone includes the address ID code of the pager. The message also may include the instruction or command of what action is to be taken by the pager, such as display a telephone number or other alphanumeric display. The message may include a command originated by the telephone caller or by the central controller, that the pager transmits back an acknowledgment code.

The central controller converts the message into a transmission code that is easily transmitted by area transponder 46 by way of the antenna cluster, and is easily decoded by the pager.

The pager is a small portable transceiver carried on-person by the paging service subscriber. Consequently, a pager is carried in and out of the transmission range of one or more antenna clusters of the paging service network. Since the whereabouts of a particular pager is unknown to the paging service at the time of initiation of a message transmission by the central controller 30, all area transponders 46 simultaneously transmit location request bursts of the pager address ID code of the desired pager on all antenna clusters.

All pagers in transmission range of the antenna clusters receive the call. Upon receipt of a burst of a particular pager's ID address code from all antennas of a paging network that are within receiving range, the particular pager addressed sends back an acknowledgment burst as a notice that the broadcast burst was received. All other pagers remain silent.

In response to the acknowledgment burst from the pager, only the paging network transmitting antenna which is approximately closest to the responding pager continues to communicate with the pager for as long as it is necessary for the immediate communication.

Typically, the location request burst and response burst are transmitted on a separate frequency channel from the message transmission channel. This allows a message to be sent to the alerted pager without alerting the remaining pagers in the area of the transmitting antenna cluster.

The paging network does not transmit to any of the remaining pagers unless it receives another message designating one of the pager address ID codes from one of the remaining pagers.

This procedure frees up the other paging network transmitting antennas for communication on the same frequency with other pagers.

In FIG. 2, PRIOR ART commercial pager 250 is similar to ones in the prior art for communication with a pager service. It includes RF transceiver 252, and digital signal processor 254 which processes information from controller 256 for transmission, or processes information from the transceiver for the controller.

In a more advanced prior art pager such as pager 250, an RS 232 communication port 262 is provided. Port 262 is connected to the controller so that information can be communicated to and from an external device 264 RS232 communication port by way of the pager.

Battery 258 provides power for power supply 260.

List A shows the advantages and disadvantages of various communication systems for two-way command, control and monitoring of a residential or small manufacturing site, compared to the present invention system.

In the list, (1)=sharing a telephone line with the site owner
(2)=two-way communication initiated by the site device
(3)=two-way communication initiated by the utility company, requires a telephone line at the utility site and special service by the telephone carrier to establish communication with the site device without disturbing the site telephone subscriber.

LIST A:

| System features | Power line | cable | Shared (1) telephone in (2) | Shared (1) telephone out (3) | Radio fixed | Radio mobile | Invention pager system |
|---|---|---|---|---|---|---|---|
| Avoid high equipment investment, including radio licenses | no | yes | yes | yes | no | no | yes |
| Is practical when not many sites are in the area | no | yes | yes | no | no | no | yes |
| Competition between communication systems, encourages low tariffs | NA | no | yes | no | NA | NA | yes |
| Service to site is unaffected by disconnect of the wired services | no | no | no | no | yes | yes | yes |
| Brief two-way transmission between long periods results in low total tariffs | NA | no | yes | no | no | NA | yes |
| Brief two-way transmissions between brief periods results in low total tariffs | NA | no | no | no | no | NA | yes |
| Negligible wait to initiate a communication | yes | yes | no | no | yes | no | yes |
| Communication is unaffected by other users | yes | yes | no | no | yes | no | yes |
| Has broadcast and polling capabilities | yes | yes | no | no | yes | no | yes |
| Available at all times | yes | yes | yes | yes | yes | no | yes |
| Communications can be initiated by site device or by the utility | yes | yes | yes | no | yes | no | yes |

SUMMARY OF THE INVENTION

It is one object of the invention to provide a system for remote monitoring of equipment at a utility user site.

It is another object to provide a system for remote command of equipment at a utility user site.

It is another object to provide a system for remote control of equipment at a utility user site.

It is another object that the system which provides monitoring, command, and control can be accessed at all times for operation of the system.

It is another object that each site can be accessed by the system at low communication cost.

It is another object that there is little or no tariff cost for communication when the system or site is not being communicated with.

It is another object that the system implementation requires little or no additional capital investment in the communication medium.

It is another object that the system does not require direct connection between sites of one to the other.

It is another object that the communication between the system and each site is free of overriding interference from other users of the communication medium.

It is another object that one or more sites can be commanded and/or controlled by a single, brief, use of the communication medium.

It is another object that a plurality of providers of the communication medium may operate in a region common to one or more of the sites so that communication with the system sites is made at relatively low competitive cost.

Other objects and advantages will become apparent to a reader of the ensuing description of the invention.

In the invention, a method for performance of an apparatus related task by radio communication between a radio pager and an available commercial paging service includes a plurality of radio pagers comprising means for performing an apparatus related task and comprising the same unique pager address ID code, emulating to the available commercial paging service a single pager having the unique pager address ID code, in responding with an acknowledgment transmission to receipt by said plurality of radio pagers of a location request transmission from the available commercial paging service of the unique pager address ID code.

The invention provides a system for remote performance of apparatus related tasks through an available commercial paging service that is configured to transmit a pager address code by radio to a plurality of pagers wherein each pager of said plurality of pagers has a unique pager address code that is different from the pager address codes of the other pagers of the plurality of pagers, and in which the commercial paging service transmits a first pager address code belonging to one of said plurality of pagers, whereby a pager which receives the transmission of its own unique pager address code transmits an acknowledgment signal to the paging service, wherein the system comprises at least one of a plurality of task radio pagers comprising means for interfacing with an apparatus, each of the plurality of task pagers having control means programmed for controlling functions of the task pager, and having the same pager address code as the other ones of the plurality of task pagers and being configured to receive a transmission of the same pager address code from the available commercial paging service, only one task pager of said plurality of task pagers being a master pager programmed to transmit an acknowledgment signal to the paging service in response to said same pager address code, the remaining ones of said plurality of task pagers receiving the same transmission of said same pager address code being programmed to not transmit the acknowledgment signal to the paging service.

The system further comprises at least one of said plurality of task pagers having at least one of an individual ID code and a group ID code in addition to said same pager address ID code, by which said control means is addressed through the available commercial paging service to instruct the task pager to perform an apparatus related task.

The system further comprises each of at least two of the task pagers having the same pager address ID code comprising means for transmitting a signal to the available commercial paging service, one of the at least two task pagers programmed to transmit a signal within one of a plurality of predetermined width time slots of a first time frame predetermined by the available commercial paging service for transmission by pagers, and the other of the at least two pagers having the same pager location ID code programmed to transmit a signal within one of a plurality of predetermined width time slots of a second time frame predetermined by the available commercial paging service for transmission by pagers.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
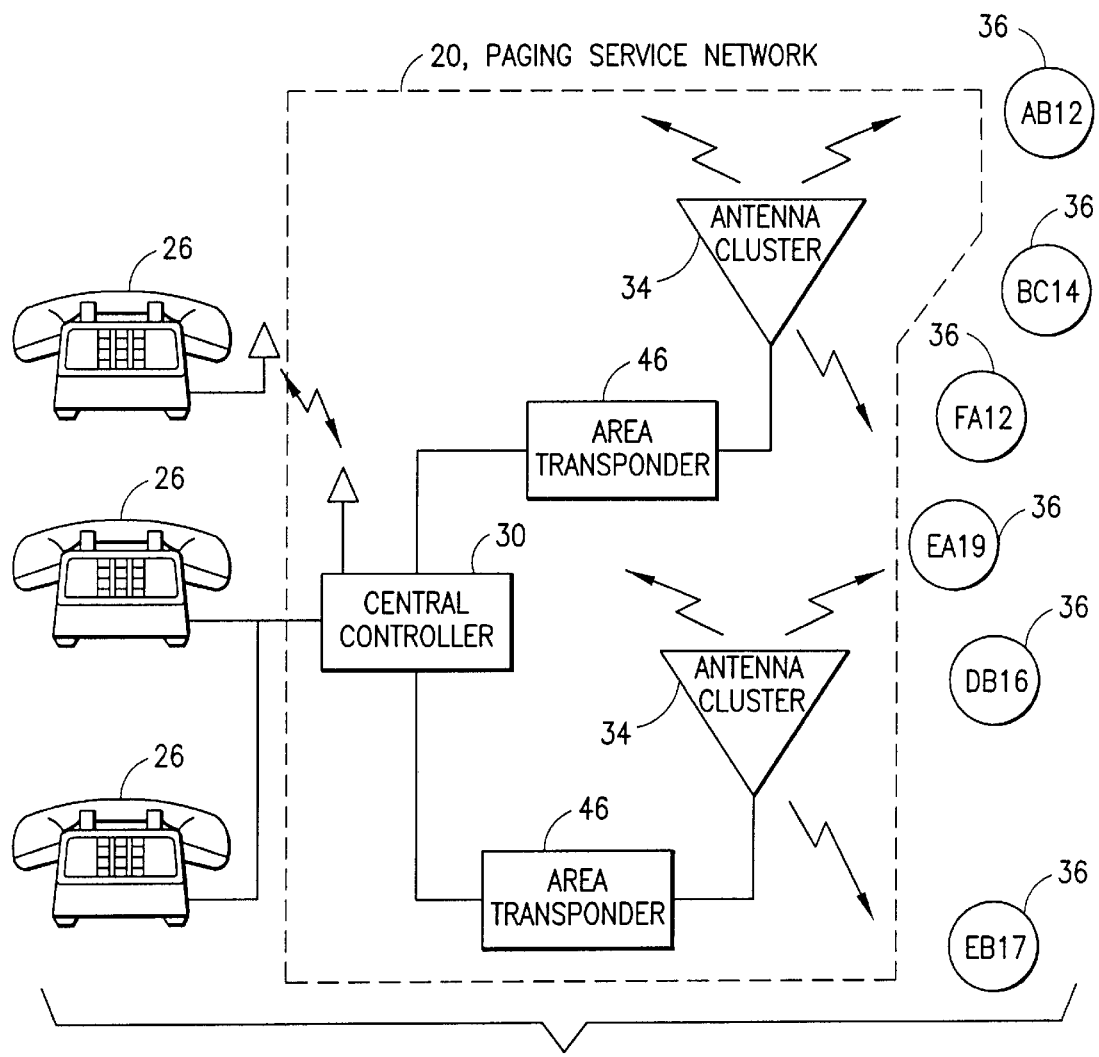
FIG. 1 is a schematic view of an array of pagers in the vicinity of two pager network transponders in a PRIOR ART standard commercial two-way paging service network.
Figure 2:
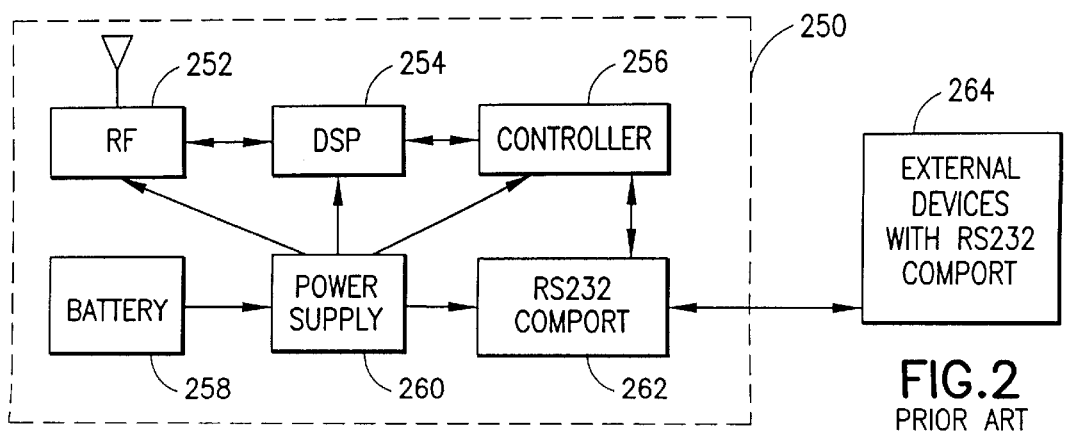
FIG. 2 is a schematic view of a Prior Art pager.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figure 3:
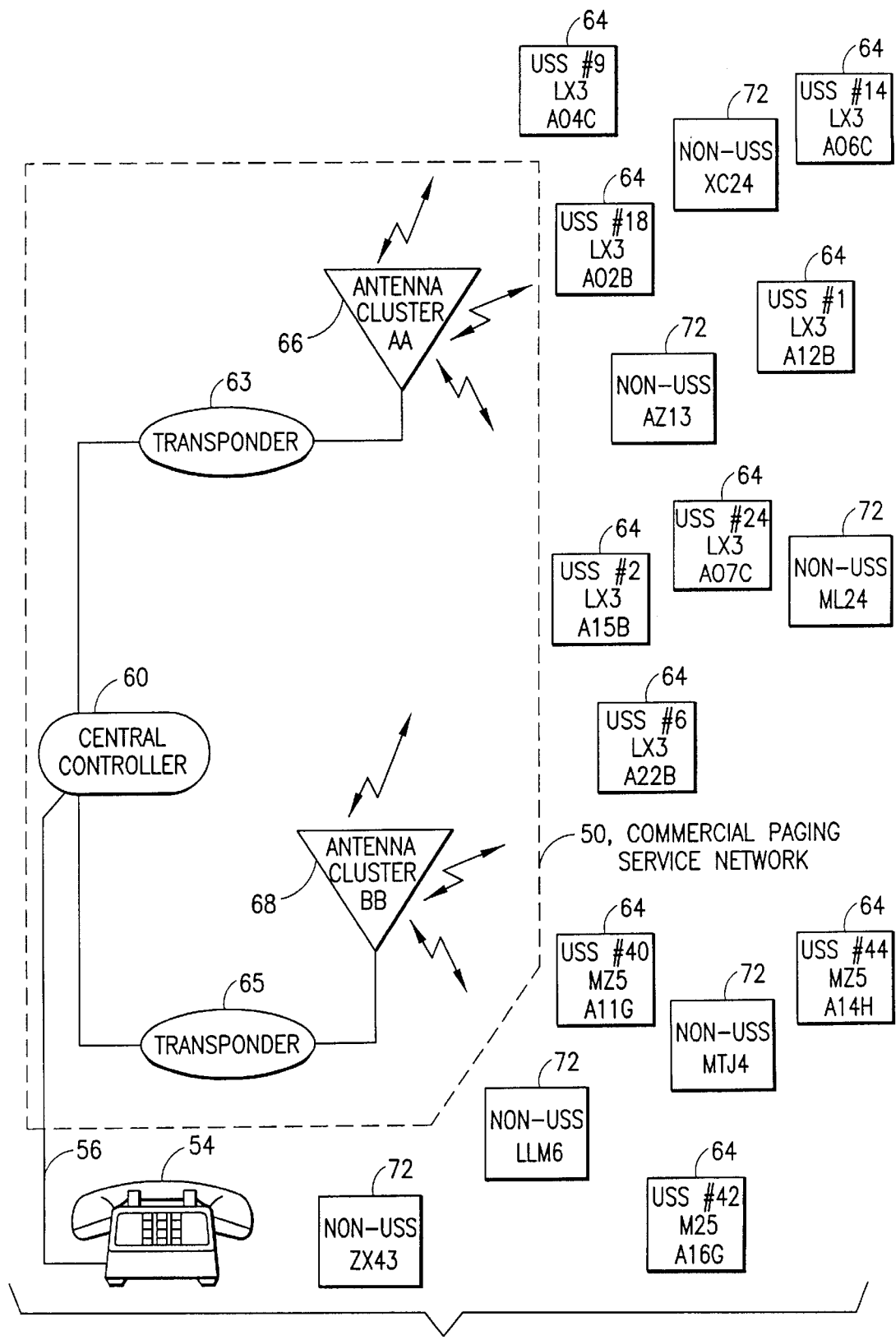
FIG. 3 is a schematic view of an array of pagers of the invention and non-invention pagers in the vicinity of two two-way pager service network transponders.

FIG. 3 shows a preferred embodiment of the present invention. Identifiers of the various pagers in FIG. 3 are in List B.

| List B: #14 = temporary master | | | |
|---|---|---|---|
| Utility Served Pager Site (USS) location | pager address ID code | level 1 individual ID code | level 2 group ID code |
| #01 | LX3 | A12 | B |
| #02 | LX3 | A15 | B |
| #06 | LX3 | A22 | B |
| #09 | LX3 | A04 | C |
| #14 | LX3 | A06 | C |
| #18 | LX3 | A02 | B |
| #24 | LX3 | A07 | C |
| #40 | MZ5 | A11 | G |
| #42 | MZ5 | A16 | G |
| #44 | MZ5 | A14 | H |
| Non US Pager | pager address ID code | level 1 ID code | level 2 ID code |
| Location variable | AZ13 | N/A | N/A |
| | XC24 | N/A | N/A |
| | ML24 | | |
| | ZX43 | | |
| | MTJ4 | | |
| | LLM6 | | |

Commercial paging service network 50 is accessed by a utility service provider, or "utility" by way of communication terminal means such as telephone 54 through telephone line 56 to central controller 60.

Central controller 60 converts a message from line 56 to a form that is decodable by pagers 64 and 72 so that each of pagers 64 of the invention and pagers 72 which are not of the invention can recognize the pager address ID code being transmitted by antenna clusters 66 and 68.

Each Utility Served Site (USS) within a predetermined geographical area and within the radio signal sending and receiving range of the same antenna cluster is given a pager having the same pager address ID code. The pager only recognizes that pager address ID code.

For example, pagers which are within the sending and receiving range of antenna cluster 66 are each given the pager address ID code LX3. Pagers which are within the radio signal sending and receiving range of antenna cluster 68 are each given the pager address MZ5. For convenience of description, pagers which are within the sending and receiving range of an antenna and are given the same pager address ID code are called a "reception cluster". The above groups of pagers may be called reception cluster LX3 and reception cluster MZ5 respectively.

Utility served site (USS) #6 is within radio signal sending and receiving range of antenna cluster 66 and antenna cluster 68. Although it can be given pager address ID code LX3 or pager address ID code MZ5, it is given pager address ID code LX3 because it is expected that utility user site #6 for the most instances will need to receive instructions that are common to those utility served sites having the LX3 code. It is part of the LX3 reception cluster.

In areas of high density of Utility Served Sites, more than one reception cluster may be assigned to each antenna cluster.

When the paging network central controller 60 receives a signal from a subscriber utility which wishes to communicate, say with locations #'s 2, 6, and 18 to obtain meter readings or for some other purpose, the pager service, operating as it does for all pager subscribers, sends out a burst for one particular pager, i.e. LX3.

All LX3 pagers receive the signal, but only one of the LX3 pagers responds and sends back an acknowledgment code. This responding pager, called the "master pager", has been designated in advance to be the responding pager. For sake of explanation, let us say that the master pager is pager #14.

Pager #14 and the other LX3 pagers receive the paging system's location request burst, but pager #14, after giving the acknowledgment burst, has no requirement to report and remains silent.

Pagers #'s 2, 6, and 18 transmit the readings as requested by the message from the commercial paging service network, each identifying itself with an LX3 communication code.

The communication with the commercial paging service network 50 transponder 63 is carried out by the three pagers having the same pager address ID code and tuned to the appropriate radio frequencies in a way so that the service transponder views it as communicating with a single pager.

Network 50, operating as if it were communicating with one and only one LX3 pager, is operating as it normally does when it communicates with pagers which are not part of the present invention. It is not necessary to change the way the commercial paging service network normally works when it is working with the present invention.

That is, to transponder 63 or 65, the family of pagers of which each has the same pager address ID code, is a single pager.

Beyond the pager address ID code for the pager service request for communication, each pager is assigned ID codes. That is, a unique level 1 individual ID code and may have one or more level 2 group ID codes. These codes are preferably stored in memory in the pager. The level 1 code is preferably assigned at manufacture of the pager, but may be changeable. Level 2 group ID codes may be changed via communication with the subscriber utility during any communication session.

The command that the pager service sends may be delayed until after the communication link is established using the Pager address ID code. The command requesting that the three locations report back to the paging service network, is brought to their attention by accompanying the command with the location's level 1 individual ID codes, or, with a level 2 group ID code such as group B which will also command site #1. Any single location, or groups of locations can be commanded by using combinations of the level 1 individual ID code/s and/or level 2 group ID codes. referring to list C of tasks performed by the pagers;

| LIST C: |  |
|---------|---|
| Responsive Tasks (examples) | |
| R1 | Read meter |
| R2 | Switch electric off to user |
| R3 | Switch electric on to user |
| R4 | Be the master |
| R5 | Other |
| Initiative Task (examples) | |
| I1 | Send event occurrence |
| I2 | Send "accomplished" |
| I3 | Send "not accomplished" |
| I4 | Other | the message can provide whatever codes are necessary to send different instructions to different sites, such as A12 to do R1 and R5, and A15 to do R2, and group C to do R1, (where #9, #14, and #24 would read and report), so that 6 tasks in all would be formed.

Any work performed on or from apparatus to which the pager is connected or attached is defined in the specification and claims herein, as performing a task on an apparatus, and is also defined as performing an apparatus related task. The work includes and is not limited to, reading a meter, receiving data from the apparatus, monitoring apparatus function, switching, controlling, reprogramming the apparatus, transmitting information about the apparatus directly from the connection to the apparatus, transmitting information obtained earlier from the apparatus from storage aboard the pager, and reporting about performance of the task performed.

A single pager can call the paging service, initiating a call unilaterally such as if an event is to be reported, using the pager address ID code to alert the commercial paging service network transponder by way of the antenna cluster, and including the individual ID code in the message in order to inform the utility service provider of the pager site location. One site may have several meters, and the message may also include appropriate codes to identify the meters that were read.

Cost is kept low by not requiring direct connection or communication between any of the pagers, including the master, in order to control sequencing of transmissions to the pager service regardless of the number and selection of LX3 pagers that are required in a communication request. This is done by assigning, inherently to each LX3 pager, a permissible transmission time slot of predetermined width, from a plurality of slots A, B, C, etc. available in a predetermined time frame, see FIG. 6. The time frame may be 10 minutes, and a time slot may be one second, so that all sites in the reception cluster limited geographical area can make their reply within ten minutes, regardless of whether only one site was to report or hundreds of sites were to report. The cycle can be repeated every 10 minutes if necessary.

A transmission initiated by the paging service to the LX3 pagers is controlled by the paging service and is the same as the transmissions from the paging service to any non invention pager. However, the response messages initiated by the pagers must be separated so that multiple pagers will not attempt to send messages on the network at the same time and thus cause interference between the messages. One way is by utilizing a timing scheme.

The paging service, which communicates with pagers not of this invention, such as non Utility Served Site pagers 72 (Non USS) may have a time delay that it momentarily assigns to a pager for responding to the paging service initial call. This allows time for transponder selection and for handling possible conflict with other pagers.

Figure 6:
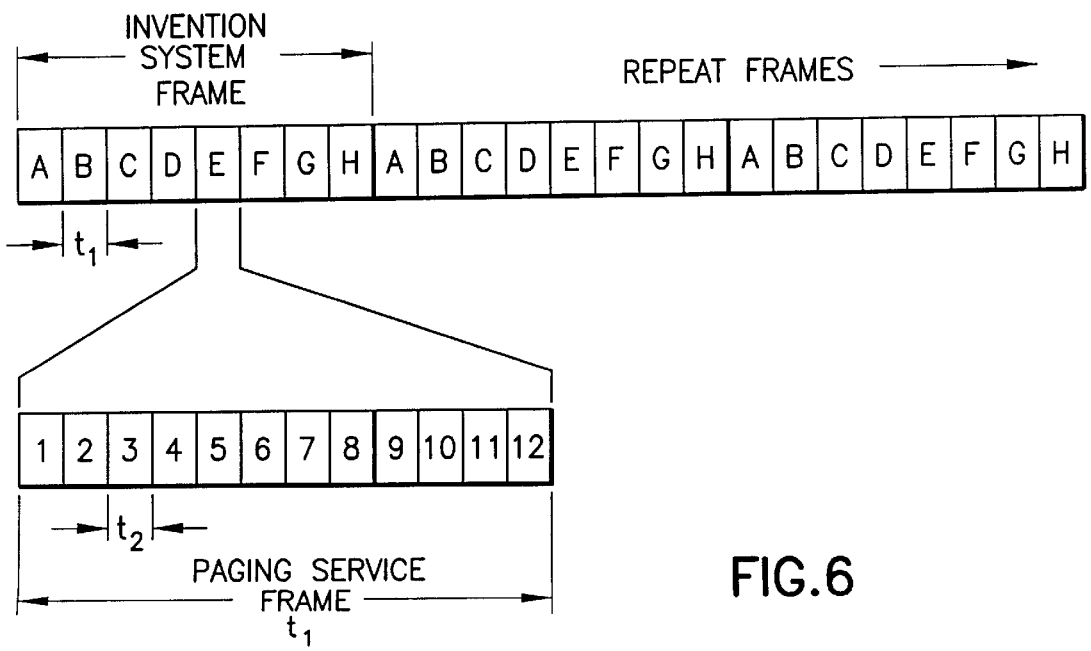
FIG. 6 is a timing sequence chart.

FIG. 6, is a Time Division Multiple Access Method in which any pager requesting to transmit a message is assigned a time (t2) slot 1, 2, 3, etc. in a frame t1. Each pager requesting to transmit a message must only transmit during its assigned time slot within the frame t1. This time slot is assigned by the paging service at each message request by a pager to send a message. The message may be sent on a separate frequency.

In the present invention, the paging service frame becomes one time slot in the invention system frame, and determines the width of the invention system frame time slots, and therefore the invention system frame time width. The number of time slots in the invention system frame is predetermined by the utility service provider, and is determined from the width of the pager service time frame t1 and the acceptable delay between messages and a pager response. One invention pager gets a slot only t2 wide within a t1 time frame. It may therefore share the time frame t1 with other non invention pagers each having a t2 time width. Two invention pagers having the same address ID codes should not occupy the same paging service frame. That is, only one LX3 pager should be assigned to each invention frame time slot, to avoid confusion.

When the number of Utility Served Sites in one reception cluster gets so large so that the number of slots in a frame required to accommodate all the Utility Served Site pagers results in an overly large frame and an unacceptable message response delay, a new reception cluster can be assigned among the invention pager's antenna cluster area. The new reception cluster pagers would be given a new common pager address ID code.

Specific Utility Served Site pagers at sites that require faster response times can be assigned to multiple slots in the invention system frame to reduce their response times.

Invention pagers having different address codes can occupy the same paging service time frame t1, by different ones of slots 1–12.

Cost is also low because the commercial two-way paging service does not have to change its standard equipment or procedures to accommodate the particular needs of the invention's pagers. This is accomplished by the timing sequence cited above being adjusted to fit within communication time slots of the commercial paging service, and the sharing of a standard paging service identifier code, although unique codes may be added in the message. This allows a plurality of pager sites to operate as a single paging system address, thereby avoiding a separate billing account for each site.

All time related slots and events are synchronized automatically with a common time standard so that each pager operates independently regardless of which or how many others are to transmit to the service, without interference with another. The common time standard may be Universal Time, for example. Preferably, the invention pagers use the same time standard as the commercial paging service. Accurate time is maintained in each pager throughout periodic communications between the paging service and all pagers.

Instead of time sequencing, other methods designed to prevent the transmissions between the paging service network and the pagers from interfering with one another may be used.

Each Utility Served Site pager is provided with an information storage and control circuit which:

(a) indicates whether the pager is a master pager, whereby the pager responds appropriately to the first burst from the paging service, (b) indicates whether the pager's level 1 ID code and/or level 2 code is received with task instruction, whereby if so directed, the pager initiates carrying out the task/s, (c) after carrying out the task/s such as read meter, the pager waits for its permissible transmission slot in Universal Time, and reports, including about responsive tasks and initiative tasks.

Figure 4B:
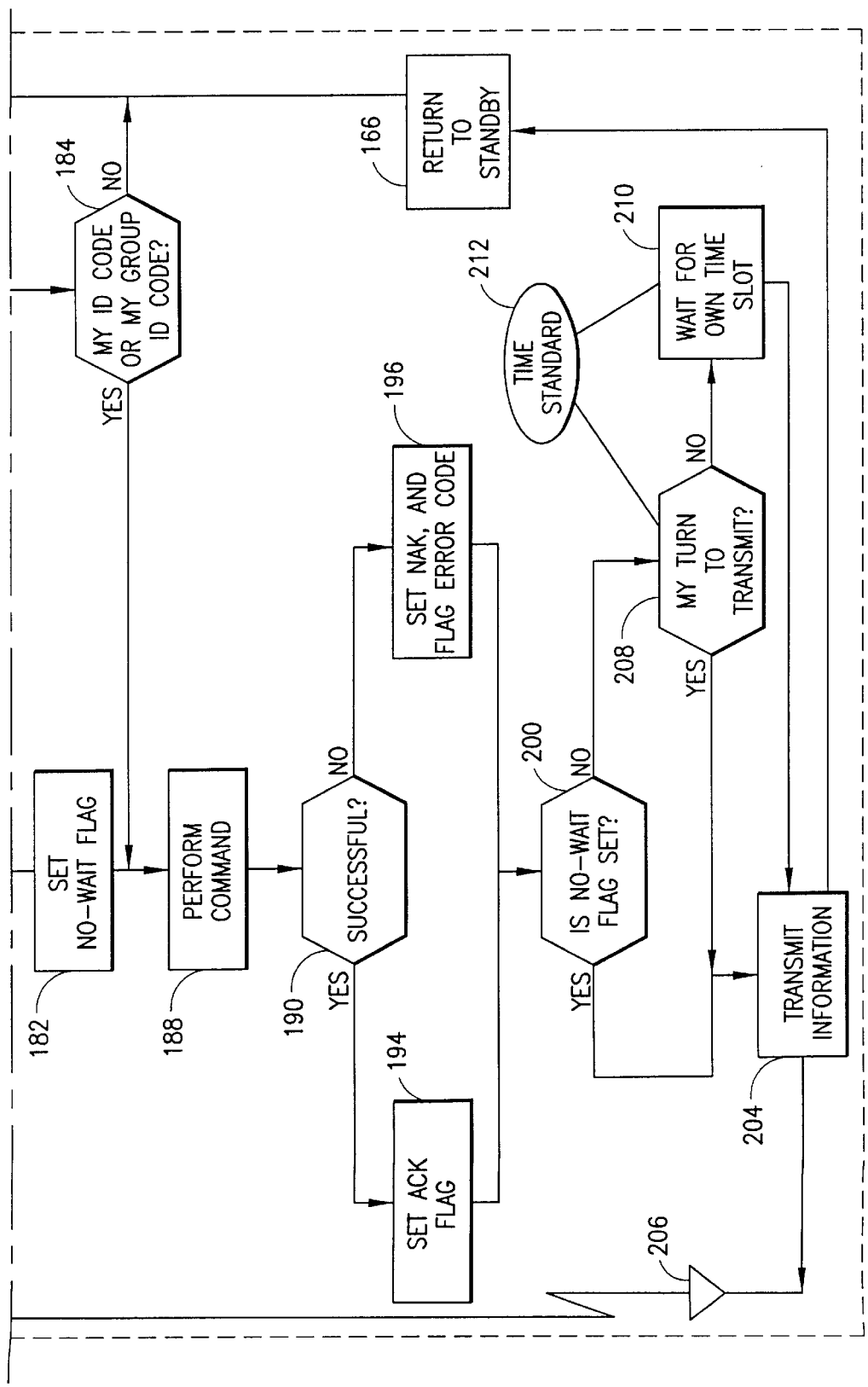
FIG. 4 is a flow chart of operation steps of a pager of the invention.

Referring to FIG. 4, a subscriber to the pager service, such as an electric power utility accesses pager service 150 by communication terminal means such as modem 152, computer, or other means for sending messages to a commercial paging service. The message includes a pager address ID code, and later, an individual and/or a group ID code as discussed above.

The pager service broadcasts 156 the message.

Step 160, the broadcast signal is received by antenna 170 of pager 164. Pager 164 asks in step 162 if the signal received includes the pager's address ID code, which would be the same code as the other subscriber's pagers in the reception cluster. If it is not, the pager returns to standby, step 166.

If the received pager address ID code matches the pager's, the pager asks in step 168 if it is a master pager. If it is programmed to be the master pager for the reception cluster, it transmits in step 172 an acknowledgment burst to the pager service antenna cluster 154 by way of its antenna 155. Upon receiving the acknowledgment burst at antenna 154, the pager service communicates with pager 164 for the remainder of this session only through antenna 154 rather than attempting communication through some other antenna cluster (not shown).

After the communication link is established, the pager service sends out the subscriber's message. The message may be included in a first communication transmission or a follow up one. The term "signal" used herein means one or more transmissions which establish the link and send the messages. FIG. 4 describes processing of a signal.

Regardless of whether or not the pager is a master, it decodes the message, step 176. The pager asks, in step 178, if the message contains only the pager's individual ID code. If the answer is yes, the pager in step 182 sets a no-wait flag which affects later steps, and in step 188 it performs the tasks that the message commands.

If the message does not contain only the pager's individual ID code, it asks in step 184 if it is more than one individual code including the pager's individual code, that is, "my ID or my group ID?". If the answer is no, the pager returns to standby in step 166. If the answer is yes, the pager performs step 188.

In step 190, the pager asks if the performance of the tasks that it made was successful, that is, did it meet the requirements of the message command, such as read a meter and store the readings for transmission to the utility service, turn off a generator, shed a load. If the answer is yes, an ACK flag is set in step 194, and meter read values are held ready for transmission. If the answer is no, a NAK flag is set in step 196, and information about the reason for failure, contained in an error code, is held ready for transmission.

In step 200, the pager asks if the no-wait flag is set. If yes, it goes to step 204 without waiting for it's unique time slot to transmit, but takes the first available time slot and transmits out of turn the information by way of antenna 206.

One antenna element may be used for antennas 155, 170, and 206. If the no-wait flag is not set, the pager in step 208 reviews the time standard and asks if it is its turn to transmit. If the answer is yes, it transmits in step 204. If it is not its turn to transmit, it waits for its own time slot in step 210 with reference to time standard 212, and then transmits in step 204. To permit a quick response, the utility service provider may assign one or more of the invention system frame slots A, B, C, etc. to each be a slot for out of turn transmission.

The period or time span between a two-way location request burst of the pager address ID code from the pager service and pager ID address code response that establishes communication between the pager service and the pager, and the next two-way location request burst of the pager address ID code from the pager service and pager ID address code response that establishes communication between the pager service, is herein called a "communication period".

Throughout the communication period, the master pager remains the master. It should be understood, however, that a different pager of the reception cluster can be made the master pager.

This can be done by a command transmitted in the previous communication period. This may be necessary, for example, for maintenance purposes or a change in location of Utility Served Sites.

Figure 5:
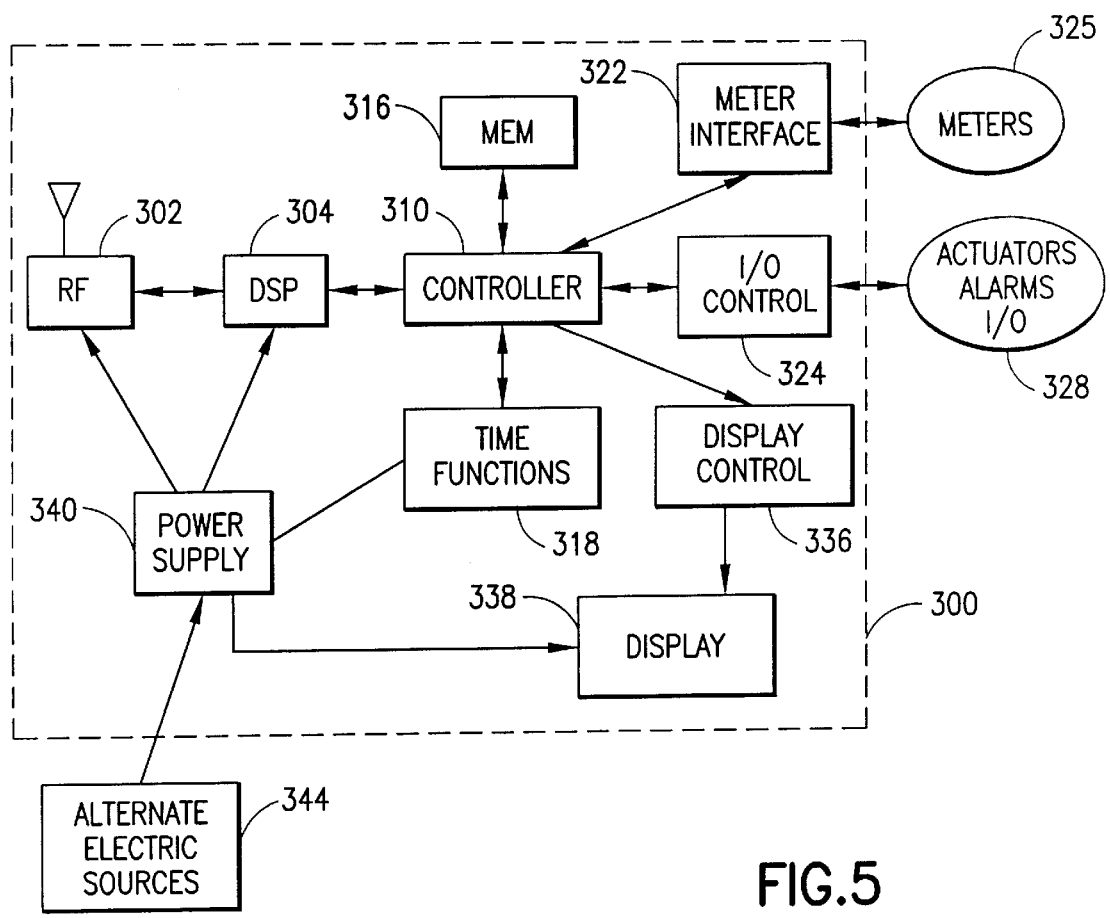
FIG. 5 is a block diagram of a pager of the invention.

In FIG. 5, pager 300 of the present invention includes RF transceiver module 302 connected to digital signal processor module 304 which is connected to controller module 310.

Preferably the RF module 302 and the digital signal processor module 304 include circuits, and performance characteristics, which are the same as non-invention pagers which use the paging service, so that initiation of communication, and reception and transmission of data between the commercial paging service network transponder and the pager of the invention is as it is for the non-invention pagers.

Controller module 310 includes a commercially available microcomputer which is programmed to take the pager through steps described in FIG. 4.

Data memory module 316 connected to controller module 310 stores data received by the pager and data for transmission by the pager.

Time function module 318 includes the time standard that is reviewed by the controller in carrying out the steps which is updated periodically in communication with the pager service.

Meter interface module 322 provides data from reading of meters 325 in usable form by controller module 310.

Input/Output control module 324 provides control signals in a form that is usable by apparatus such as actuator and alarm input and output circuits of utility served devices 328, and puts data from the apparatus in usable form for controller module 310.

The I/O control can operate actuators, alarms, and other electrical devices by means known to the art, for example by electronic and electromagnetic switches.

Display control module 336 operates display module 338 for monitoring by a service person.

Power supply 340 provides power to all modules, and may be supplied by power from a battery or other electric source 344.

It should be understood that change in the arrangement number and order of steps in FIG. 4 may be made without departing from the spirit and scope of the invention. A signal from the pager service includes one or more transmissions that establish the communication link and communicate a message to the pager.

The application of this invention is not limited to Utility Served Sites. For example, it may be used for security systems, energy management systems, home alarms, traffic control, and is cost effective for other remote control two-way command, control, or monitoring applications which require low cost two-way, occasional burst communication.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A system for remote performance of apparatus related tasks through an available commercial paging service that is configured to transmit a pager address code by radio to a plurality of pagers wherein each pager of said plurality of pagers has a unique pager address code that is different from the pager address codes of the other pagers of the plurality of pagers, and in which the commercial paging service transmits a first pager address code belonging to one of said plurality of pagers, whereby a pager which receives the transmission of its own unique pager address code transmits an acknowledgment signal to the paging service, the system comprising:

a plurality of task pagers at least one of the plurality of task pagers comprising means for interfacing with an apparatus, each of the plurality of task pagers having control means programmed for controlling its functions, and having the same pager address code as the other ones of the plurality of task pagers and being configured to receive a transmission of the same pager address code from the available commercial paging service, only one task pager of said plurality of task pagers being a master pager programmed to transmit an acknowledgment signal to the paging service in response to said same pager address code, the remaining ones of said plurality of task pagers receiving the same transmission of said same pager address code being programmed to not transmit the acknowledgment signal to the paging service.

2. The system of claim 1 further comprising:

at least one of said plurality of task pagers having at least one of an individual ID code and a group ID code in addition to said same pager address ID code, by which said control means is addressed through the available commercial paging service to instruct the task pager to perform an apparatus related task.

3. The system of claim 1 further comprising:

at least one of said plurality of task pagers having an individual ID code and a group ID code in addition to said same pager address ID code, by which said control means is addressed through the available commercial paging service to instruct the task pager to perform an apparatus related task.

4. The system of claim 2, further comprising:

each of at least two of the task pagers having the same pager address ID code comprising means for transmitting a signal to the available commercial paging service, one of the at least two task pagers programmed to transmit a signal within one of a plurality of predetermined width time slots of a first time frame predetermined by the available commercial paging service for transmission by pagers, and the other of the at least two pagers having the same pager location ID code programmed to transmit a signal within one of a plurality of predetermined width time slots of a second time frame predetermined by the available commercial paging service for transmission by pagers.

5. A method for remote performance of apparatus related tasks by radio communication between a radio pager and an available commercial paging service which broadcasts a signal, the radio pager having means for interfacing with apparatus and for processing a radio signal received by the pager and controlling functions of the pager, the method comprising the pager performing the steps of:

(a) receiving the broadcast signal, (b) determining whether the signal includes the pager's address ID code, (c) if in step (b) the pager determines that the signal does not include the pager's address ID code, the pager going into standby, (d) if in step (b) the pager determines that the signal does include the pager's address ID code, and the pager is a master pager, transmitting an acknowledgment signal to the available commercial paging service and performing step (f), (e) if in step (b) the pager determines that the signal does include the pager's address ID code, and the pager is not a master pager, performing step (f), (f) determining whether the signal includes an individual pager ID code that matches the pager's own individual ID code, wherein an individual pager ID code is different from the pager's pager address ID code, and performing the apparatus related task addressed by the signal for performance by a pager with the pager's own individual ID code.

6. The method of claim 5, comprising the pager:

determining whether the signal includes a group pager ID code that matches the pager's own group pager ID code, wherein the group pager ID code is different from the pager's pager address ID code and the pager's individual pager ID code, and performing the apparatus related task addressed by the signal for performance by a pager with the pager's group pager ID code.

7. A method for remote performance of apparatus related tasks by radio communication between a plurality of radio pagers each comprising the same pager address ID code, and an available commercial paging service which broadcasts a signal, the radio pagers comprising means for interfacing with apparatus and each pager comprising means for processing a radio signal received by the pager and controlling functions of the pager, the method comprising each of the plurality of pagers performing the steps of:

(a) receiving the broadcast signal, (b) determining whether the signal includes the pager's address ID code, (c) if in step (b) the pager determines that the signal does not include the pager's address ID code, the pager going into standby, (d) if in step (b) the pager determines that the signal does include the pager's address ID code, and the pager is a master pager, transmitting an acknowledgment signal to the available commercial paging service and performing step (f), (e) if in step (b) the pager determines that the signal does include the pager's address ID code, and the pager is not a master pager, not transmitting an acknowledgment signal to the available commercial paging service and performing step (f), (f) performing the apparatus related task specific for the pager according to instruction from the available commercial paging service.

8. A pager for performance of an apparatus related task in response to instruction by radio communication between an available commercial paging service which communicates with pagers by radio, the pager comprising means for interfacing with apparatus and for processing a radio signal received by the pager and for programmed control of functions of the pager, the pager being programmed to:

(a) receive a pager address ID code inquiry broadcast signal on the frequency broadcast by the available commercial paging service, (b) determine whether the signal includes the pager's address ID code, (c) if the pager determines that the signal does not include the pager's address ID code, go into standby, (d) if the pager determines that the signal does include the pager's address ID code, and the pager is a master pager, transmit an acknowledgment signal to the available commercial paging service and perform (f), (e) if the pager determines that the signal does include the pager's address ID code, and the pager is not a master pager, do not transmit an acknowledgment signal to the available commercial paging service and perform (f), (f) perform the apparatus related task specific for the pager according to instruction from the available commercial paging service.

* * * * *